June 28, 1960 W. MÜLLER ET AL 2,942,876

RECORDING AND REPRODUCING APPARATUS

Filed Feb. 2, 1954 4 Sheets-Sheet 1

June 28, 1960 W. MÜLLER ET AL 2,942,876

RECORDING AND REPRODUCING APPARATUS

Filed Feb. 2, 1954 4 Sheets-Sheet 2

RECORDING AND REPRODUCING APPARATUS

Filed Feb. 2, 1954 4 Sheets-Sheet 3

June 28, 1960 W. MÜLLER ET AL 2,942,876

RECORDING AND REPRODUCING APPARATUS

Filed Feb. 2, 1954 4 Sheets-Sheet 4

United States Patent Office
2,942,876
Patented June 28, 1960

2,942,876

RECORDING AND REPRODUCING APPARATUS

Willy Müller, Zurich, Switzerland, and Walter Grandjot, Erich Osterloh, and Gunter Werner, Bremen, and Erich Dulze, Bremen-Huchting, Germany, assignors to Willy Müller, Zurich, Switzerland Filed Feb. 2, 1954, Ser. No. 407,792

6 Claims. (Cl. 271—2.1)

The present invention relates to a sound recording and reproducing device of the broad tape or belt type record medium and more particularly to a novel belt drive mechanism for a magnetic sound recording and reproducing device.

Heretofore in the known devices of this type, it has been usual practice to mount the belt or broad tape about several rollers, tensioning it thereabout so that the belt is driven by the frictional contact on the inner surface thereof.

According to the present invention we have provided a belt or broad tape driving and guiding mechanism which requires but a single roller for operation thereof. In a preferred embodiment of the persent invention a single main driving roller is mounted cantilever fashion in co-operation with one or more resilient pressure rollers for maintaining the belt in contact with this main roller. The translating head is then mounted adjacent the main roller for relative movement longitudinally along a generatrix thereof for movement from one line to the next. To maintain constant and accurate alignment of the belt at least one of the pressure rollers is mounted at a slight angle to the axis of the main roller so that it constantly tends to shift the belt in the axial direction of the roller toward one end thereof. An abutment preferably mounted on the roller itself is provided on said end to limit this axial movement.

In addition a braking mechanism is provided to tension the tape or the belt to increase the arc of contact with the roller and to insure accurate and positive driving. In a preferred form this braking mechanism comprises a soft rubber strip which has therein a plurality of teeth or prongs which bear against the tape.

Finally, to insure proper operation by unskilled persons and to prevent damage to the belt by an attempt to shift it before lifting of the translating head, there is provided at the belt chamber entrance, a special interlock mechanism connected to the translating head such that access to the belt chamber may be had only when the translating head is lifted off the record belt.

According to the present invention there is provided a simple, economic and substantially foolproof sound recording and reproducing device.

The accompanying drawings show by way of example an illustrative embodiment in which.

Figure 2:
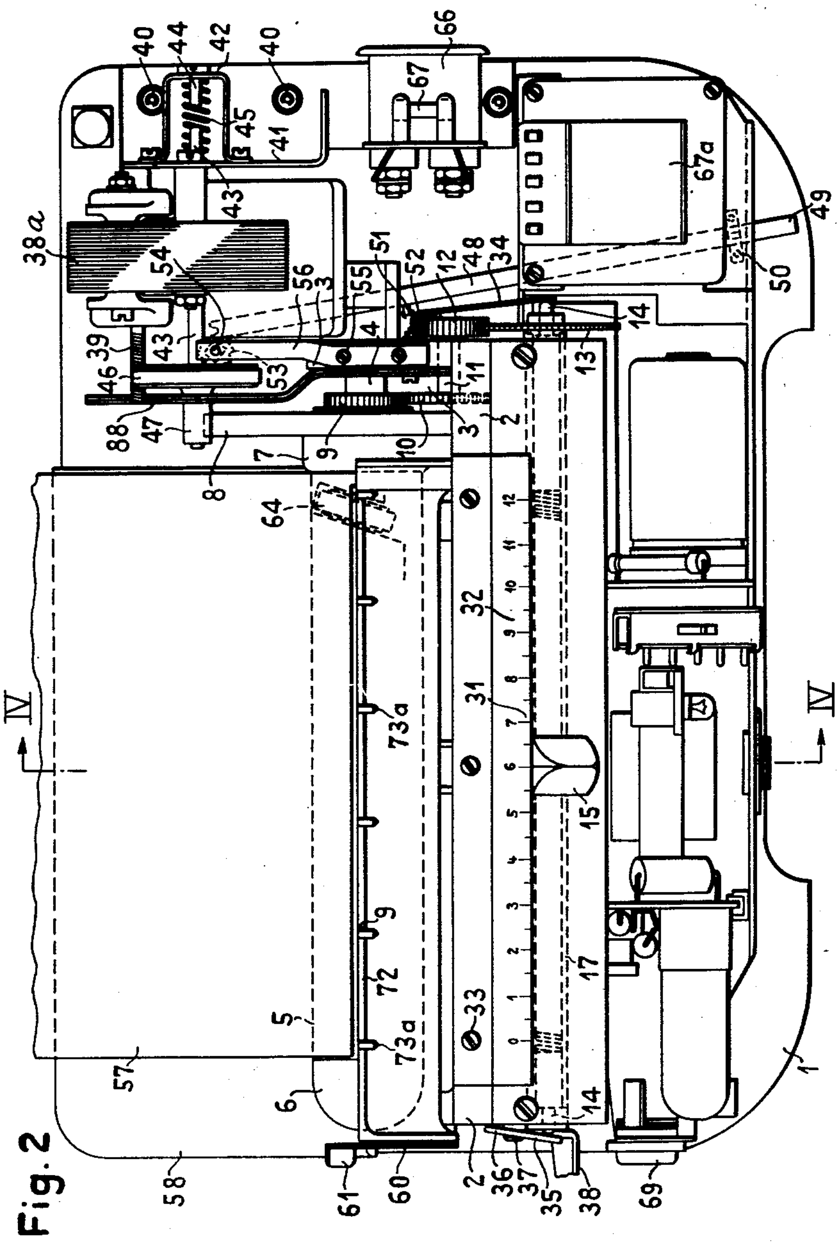
Figure 2 is a top plan view of Figure 1 with the cover removed.
Figure 3:
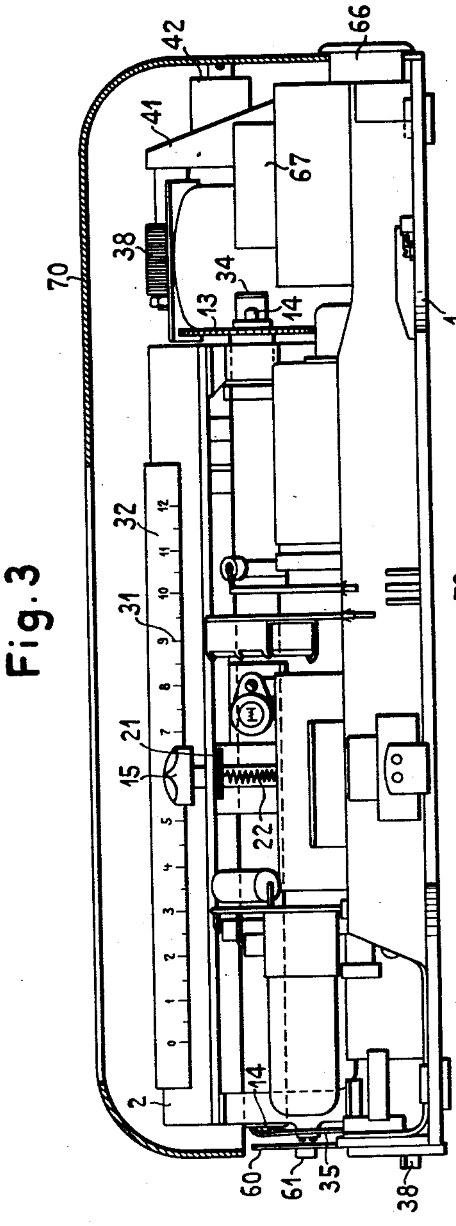
Figure 3 is a side elevation of the machine of Figure 2, with the cover partially removed.
Figure 4:
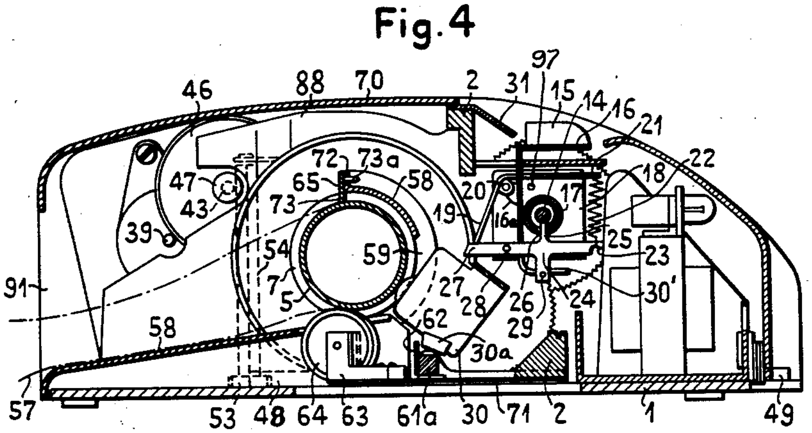
Figure 4 is a cross-sectional view taken on line 4—4 of Figure 2.

Referring now to Figures 2 through 4, a base plate 1 of the machine has fixed thereon e.g. by welding, a frame 2 which includes a bearing plate 3 positioned perpendicularly to the plate 1. Plate 3 carries thereon a pivot bearing 4 in which roller 5 is rotatably mounted on ball bearings therein. The roller 5 is provided with a rubber covering or lining and extends in cantilever fashion away from its mounting and bearing plate 3. The free end of roller 5 is closed by a hemispherical cap 6 while adjacent the fixed end there is positioned a collar 7 and a driving flywheel 8. Flywheel 8 is similarly covered with a lining of rubber or other friction material to insure proper driving by the driving motor as will be described in detail herein. Roller 5 also has fixed on its shaft adjacent bearing 4 a gear wheel 9 which meshes with an intermediate gear wheel 10 fixed on a spindle 11 rotatably journalled in the bearing plate 3. Spindle 11 carries on its other end a gear wheel 12 which meshes in turn with a gear wheel 13 mounted in turn on a threaded spindle 14. Threaded spindle 14 is rotatably journalled on frame 2 and as will be described herein, is axially shiftable.

The threaded spindle 14 permits adjustment of the saddle-shaped element 15 which in turn acts as an indicator and actuating lever for the sound recording and reproducing head 30. As may be seen in Figure 4, the element 15 is mounted on a U-shaped bracket 16 which is slidably mounted for vertical movement in a block 18. Block 18 is mounted for axial movement along a longitudinally slotted tube 17 which surrounds the threaded spindle 14. U-shaped bracket 16 is formed with a tab **16*a* which carries thereon a pin 20 on which bell crank lever 19 is pivotally mounted. The upper end 21 of this bell crank lever 19 is attached to a tension spring 22, the other end of which is attached to the hook-shaped end 23 of the lever 24. This lever 24 is substantially cross-shaped and has one arm 25 normally engaging in the thread of spindle 14 through the longitudinal slot 26 of the tube 17. Lever 24 is rotatable about axis 28 in arm 27 against the action of spring 22. The lower arm of the lever 24 carries therein a pin 29 which extends outwardly therefrom and under the lower horizontal arm 30′ of the U-shaped bracket 16. Accordingly, in addition to biasing the lever 24 upwardly toward engagement with the spindle 14, spring 22 pulls the bracket 16 upward through pin 29 and consequently element 15 is normally urged to its upper position. When element 15 is pressed down against the action of spring 22, bracket 16 bears on pin 29 which rocks the lever 24 about its axis 28. This moves the arm 25 out of engagement with the thread of spindle 14 so that block 18 with the various components mounted thereon can be shifted axially along the tube 17 by suitably directed pressure on element 15**.

Bell crank lever 19 carries at its lower end the translating head 30 which is of conventional construction and is therefore not described in detail herein. Since spring 22 tends to rock bell crank lever 19 in a clockwise direction the sound recording head 30 is urged into contact with the roller 5. Spring 22 accordingly performs a double function, serving on the one hand to hold the arm 25 of lever 24 in engagement with the threads of spindle 14 and the element 15 in its upper position and on the other hand urges the recording-reproducing head 30 against the roller 5. When element 15 is depressed and the bolck 18 axially shifted to and fro on the tube 17, head 30 is moved correspondingly along the roller 5. A pin 97, affixed to block 18, limits the extent of clockwise rotation of lever 19. Such rotation may also be limited by forming the end of lever 27 with a lip adapted to engage lever 19 just above sound head 30.

Element 15 as described above, is provided with saddle-shaped faces which form gripping surfaces to insure during operation that a vertical component force is applied to the element 15 by the operator whenever it is desired to shift the recording-reproducing head 30. Thus without any conscious effort the operator automatically disengages the lever 24 from the spindle 14 and lifts recording-reproducing head 30 off the record belt before any shifting thereof can be effected by the operating knob 15.

A suitable scale 31 is mounted on frame 2 beneath a transparent strip 32 by screws 33. Scale 31 cooperates with an index line on element 15 to indicate the position of the recording-reproducing head on the record belt.

As described above the threaded spindle 14 is axially shiftable in tube 17 within appropriate limits. As may be seen clearly in Figure 2, leaf spring 34 presses on the protruding end of spindle 14 and urges it toward the left. The other end of spindle 14 likewise protrudes slightly beyond frame 2 until it engages the inclined face 35 of lever 36. As may be seen in Figure 5 lever 36 is in the form of a bell crank pivoted about the screw 37. The upper end of this bell crank carries the said inclined face 35 and its lower end carries a lug 38 extending outwardly therefrom to form a handle therefor. As the lever 36 is pivoted about the axis 37 the inclined face 35 moves relative to the end of the spindle 14. Consequently due to the inclination of face 35 spindle 14 is axially shifted against leaf spring 34 within the limits of inclination of the face 35. Since block 18 is normally coupled to spindle 14 as described above, it is moved therewith permitting a precision adjustment of the translating head 30 relative to the roller and record belt.

Roller 5 is driven from an electric motor 38*a* which has extending therefrom a threaded shaft 39. Mounted adjacent motor 38*a* in a vertical frame portion 41 is an axle 43. Frame portion 41 is secured to the base plate 1 by screws 40. Axle 43 is journalled for universal movement in frame portion 41 by coiled spring 45 mounted on a threaded bolt 44 which is screwed into U-shaped bracket 42 which is fixed on frame portion 41. Bolt 44 extends only partially into spring 45 at one end and the other end thereof is placed over the end of axle 43. Axle 43 has rotatably mounted on its free end a friction wheel 46. This wheel 46 is provided with a tire of rubber or similar material and bears under the action of spring 45 on shaft 39 of the electric motor 38. Friction wheel 46 has extending therefrom on the axle 43 a hub 47 which contacts friction wheel 8 of the belt roller 5. When the motor 38 is energized shaft 39 is rotated. This movement is transmitted through friction wheel 46 and hub 47 to friction wheel 8 and then on the one hand to roller 5 and on the other via gears 9, 10, 12, and 13 to the spindle 14.

Figure 6:
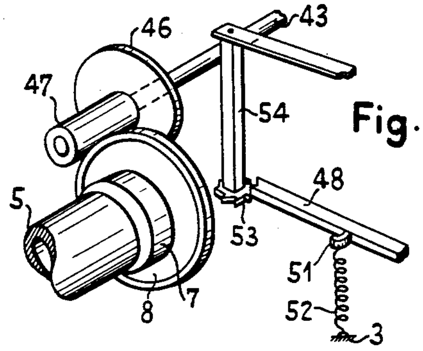
Figure 6 is a perspective detail view of the driving linkage for the belt roller.

A push rod 48 is provided to control the engaging and disengaging of the drive of the roller 5. Rod 48 is mounted above base plate 1 in a bracket 50 for longitudinal movement under the control of tension spring 52 mounted between a hook 51 thereon and bearing plate 3. The front end 49 of the rod serves as a handle and the rear end is urged by spring 52 against a small ratchet wheel 53, see Figure 6. Ratchet wheel 53 may be made of suitable artificial material such as plastic, as may the rod, and is mounted on a square shaft 54, which extends upwardly from the base plate 1 adjacent the end of bearing plate 3. Shaft 54 is rotatably mounted in the base plate at its lower end and at its upper end rotatably journalled in an arm 56 screwed to bearing plate 3 by means of screws 55. Shaft 54 is positioned such that it is immediately adjacent the axle 43. Thus when shaft 54 is in a position with its side faces parallel to the axis of axle 43, hub 47 contacts friction wheel 8. In this position the device may be operated as described above. However, when the square shaft 54 is in the position shown in Figure 2 in which all its lateral faces are at an angle of 45° to the axis of axle 43, axle 43 is slightly displaced whereby hub 47 is lifted off the friction wheel 8 against the action of universal pivot spring 45.

Ratchet wheel 53 has the teeth thereon arranged such that each operation of push rod 48 rotates shaft 54 45° so that hub 47 is either completely lifted off friction wheel 8 or urged into full contact therewith. Spring 52 acts at a slight angle with respect to push rod 48 such that it both restores push rod 48 to its starting position and also maintains the rear end thereof in contact with the teeth of ratchet 43. Accordingly a simple push on the front end 49 of the rod 48 engages or disengages the coupling between the driving motor 38 and the roller 5.

To insure proper recording and reproducing the electrical motor components of the machine are electrically shielded from the magnetic head by a suitable shield 88 mounted on base plate 1.

This arrangement just described has the advantage that when the machine is in the operating position gravity tends to urge the components 46 and 47 into contact with the friction wheel 8 and the threaded shaft 39. When the device is not in use it is preferably stored by standing on its back wall perpendicular to the base plate 1. Thus in this position the weight of the axle 43 and the components 46 and 47 tends to move them away from the friction wheel 8 and threaded shaft 39. The formation of grooves or dents in the rubber lining of the drive wheels, which might cause irregularities in the operation of the device is prevented. To insure that the axle 43 and the components 46 and 47 move away from the friction wheel 8 and the threaded shaft 39 when in the inoperative position, a suitable guide may be provided.

An endless broad tape or belt of flexible paper, plastic or other artificial material having on one surface thereof a layer of magnetic material is adapted to be slid over the roller 5 into the position shown in Figure 2. Tape 57 is slid on roller 5 until it abuts the enlarged collar portion 7 at the right hand side (Figure 2) of the roller 5. As may be seen in Figures 4 and 7 the roller 5 has positioned thereabout but spaced therefrom a guide wall 58. This guide wall extends approximately to the top of the roller 5 around approximately one-half the circumference of the roller and downward to the lower edge of the base plate 1. A cover portion 70 is provided for the casing which together with the guide wall 58 forms a recording belt chamber in which the belt may be positioned for storage and carriage. The rear portion of the lid cover portion 70 has a downwardly curving lip which forms a restricted opening at the rear of the record belt chamber. The record belt is thus easily positioned within the machine by forming a curl therein as shown in broken lines in Figure 7. The record is held in this chamber by its own resiliency even when the device is carried by the handle 90 positioned on the narrow front side thereof. This also permits the storing of the machine on its narrow back face without damage to the record belt.

Figure 5:
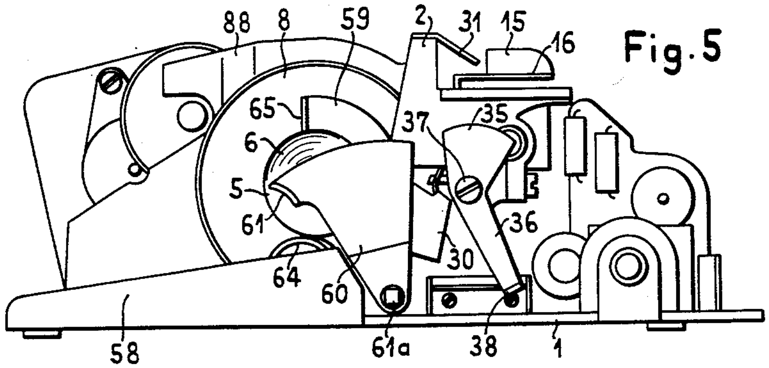
Figure 5 is an end elevational view with the cover removed, taken from the left hand end of Figure 2.

As may be seen in Figure 5 the upper portion of the guide wall 58 is spaced from the roller 5 to permit the easy insertion and removal of the record belt. The guide wall 58 has a slot 59 (Figs. 4 and 7) extending throughout the length of the roller 5 to permit the recording-reproducing head 30 to contact the record belt positioned on roller 5. Thus the head 30 can move axially along the belt on the roller 5 as it rotates thereabout.

As best seen in Figures 3 and 5, the entrance to the space between the roller 5 and the guide wall 58 is adapted to be covered by a pie shaped arm 60 which carries at one edge an operating lug 61. Arm 60 is fixed on a square shaft 61*a* which is pivotally mounted in the frame 2. A stud 62 (Fig. 4) is fixed on one edge of the shaft 61a, as by welding, so that it extends upwardly therefrom into contact with a corresponding abutment 30a on the recording-reproducing head 30. When the machine is in the operative position the components are in the position as shown in Figure 4. The arm blocks the entrance between the roller 5 and the guide wall 58 and the square shaft 61a together with the stud 62, is in the position illustrated in which the recording-reproducing head contacts the roller 5 or record tape 57 respectively. To start the operation of the device the belt must be inserted about the roller 5. To accomplish this, the arm 60 is rocked clockwise together with the shaft 61a and the stud 62 which then rocks the head 30 about the pivot 20 against the action of spring 22 until it is lifted off the roller 5. It should be noted that during this rocking movement the engagement of arm 25 with the threads of spindle 14 remains undisturbed as long as no pressure is applied on the element 15. The belt 57 may then be inserted about roller 5 as described above and the arm 60 released to return the recording-reproducing head to operative contact with the properly positioned belt 57.

In order to maintain the record belt in contact with the guiding collar 7, a roller 64 is mounted in bracket 63 on a resilient sheet metal strip 71 below roller 5. Roller 64 is mounted with its axis at an angle to the axis of roller 5 so as to resiliently engage roller 5 and yet be axially movable within limits. Roller 64 has a rubber covering or lining as does roller 5. As soon as roller 5 starts to rotate roller 64 (Figs. 2, 4, and 5) displaces itself longitudinally toward collar 7 and thus urges the record belt 57 against the collar 7.

Alternatively, if desired, several rollers such as roller 64 may be provided with the angular relationship relative to the axis of roller 5 varying slightly to insure smooth contact with roller 5 throughout the entire width of the record belt.

At the upper end of the guide wall 58 is positioned a guide and tensioning gate 65 of soft rubber, narrow brushes or the like. Gate 65 as shown comprises a strip of soft rubber provided with teeth 73 which give a soft engagement with the record belt. The strip of rubber has molded on one side thereof bosses 73a which engage in holes 9 on the edge of the turned up edge 72 of the guide wall 58. The rubber bosses may be readily inserted by slightly stretching them to reduce the diameter and inserting them through the holes 9. Upon being released, the bosses expand to their original diameter which is larger than the bore of the holes 9 and thus snugly engage the strip in proper position.

Figure 7:
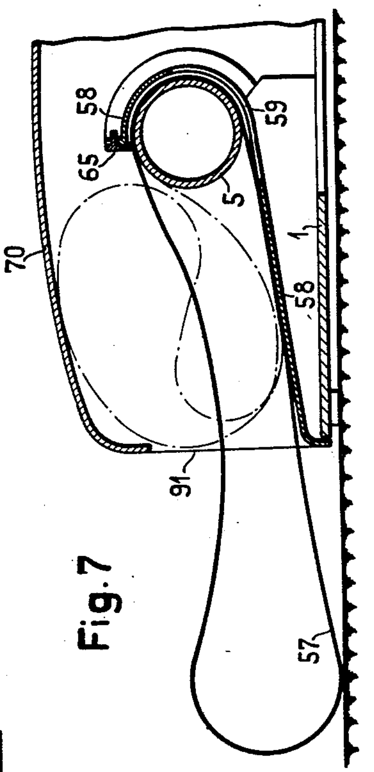
Figure 7 is a fragmentary sectional view through the record belt and roller therefor with the storage position of the belt shown in broken lines therein.

Gate 65 thus provides a slight braking action on the record belt which as seen in Figure 7, rotates in a clockwise direction and thus effects a tightening of the belt about the drive roller 5, producing a more positive and foolproof driving engagement. In addition gate 65 insures a greater arc of contact between the belt 57 and the drive roller 5.

Figure 1:
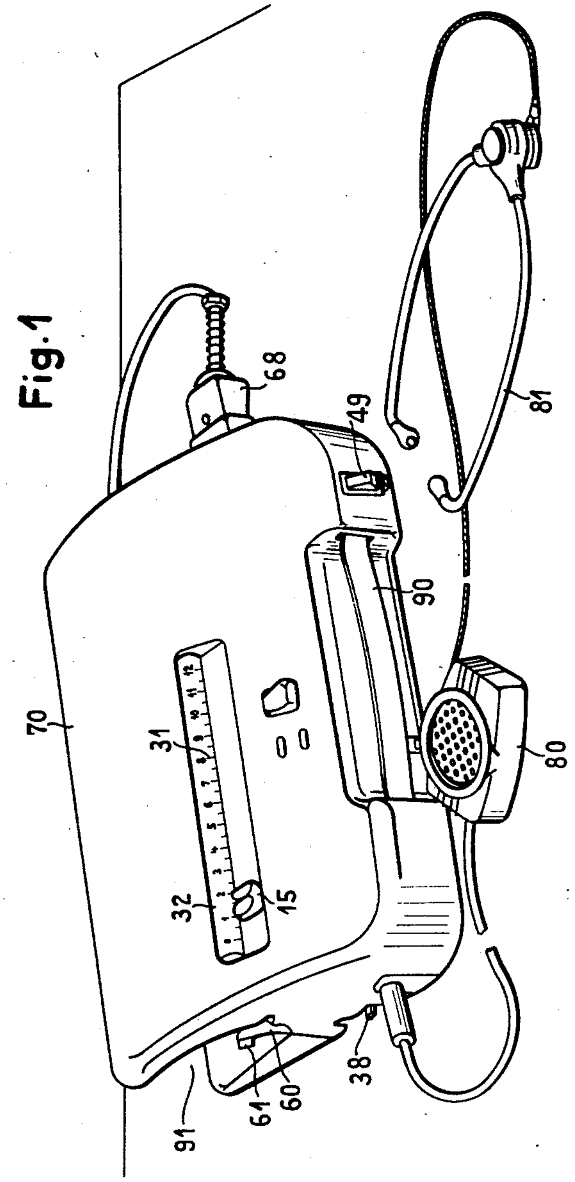
Figure 1 is an overall perspective view of a device according to the present invention.

The electric part of the machine is constructed in the usual manner and comprises in addition to the aforesaid electric motor 38, a socket 66, a fuse 67 (Fig. 2) connected to motor 38 and transformers 67a by conductors not shown and a plug 68 which carries therein a conventional on-off switch. A microphone 80 and head set 81 of conventional design are shown in Figure 1.

As various embodiments may be made of the above invention and as changes might be made in the embodiments above set forth, it is to be understood that all matter hereinbefore set forth or shown in the accompanying drawings is to be interpreted as illustrative and not in a limiting sense.

We claim:

1. In a sound recording and reproducing device employing an endless record belt, a single roller substantially smaller in circumference than the length of the endless belt and passing through and driving the belt, driving means for rotating said roller, pressing means disposed adjacent the roller and supporting the record belt in contact with at least one-half of the circumference of the roller lying on one side of a vertical plane including the axis of the roller, and a substantially horizontal guide wall disposed below said roller and extending out substantially tangentially from said roller, said wall supporting in a substantially horizontal plane a portion of the belt not in contact with the roller.

2. In a sound recording and reproducing device as described in claim 1, an outer frame portion having an opening in one side immediately adjacent the end of the guide wall, whereby the portion of the belt unsupported by the guide wall and the roller extends horizontally away from the roller through the opening in the frame.

3. A sound recording and reproducing device as claimed in claim 2 further characterized by the outer frame portion and the guide wall together forming a compartment adapted to receive the entire portion of the belt unsupported by the roller when the recording and reproducing device is in an inoperative condition.

4. A sound recording and reproducing device as defined in claim 1, further characterized by the belt in contact with at least one-half the circumference of the roller normally moving from the top of the roller to the bottom, and wherein the pressing means includes a resilient braking strip urging the belt into contact with the top of the roller and at least one auxiliary roller holding the belt in contact with the bottom of the roller.

5. A sound recording and reproducing device as defined in claim 3, further characterized by the belt in contact with at least one-half the circumference of the roller normally moving from the top of the roller to the bottom, and wherein the pressing means includes a resilient braking strip urging the belt into contact with the top of the roller and at least one auxiliary roller holding the belt in contact with the bottom of the roller.

6. A sound recording and reproducing device as defined in claim 5, further characterized by the resilient braking strip being made of a soft elastic rubber-like material.

References Cited in the file of this patent

UNITED STATES PATENTS

| | | |
|---|---|---|
| 2,410,569 | Conant | Nov. 4, 1946 |
| 2,672,346 | Roberts | Mar. 16, 1954 |
| 2,696,092 | Miller | Dec. 7, 1954 |
| 2,702,710 | Conrad | Feb. 22, 1955 |
| 2,709,596 | Pettus | May 31, 1955 |
| 2,742,284 | Munroe | Apr. 17, 1956 |
| 2,745,904 | Bobb | May 15, 1956 |
| 2,782,041 | Muller | Feb. 19, 1957 |

FOREIGN PATENTS

| | | |
|---|---|---|
| 522,153 | Belgium | Sept. 15, 1953 |
| 799,925 | France | Apr. 20, 1936 |
| 688,881 | Great Britain | Mar. 18, 1953 |